(12) United States Patent
Cowan et al.

(10) Patent No.: US 11,891,189 B2
(45) Date of Patent: Feb. 6, 2024

(54) SEAL-COVER ASSEMBLY FOR AN AIRCRAFT OR OTHER STRUCTURE AND A METHOD OF ASSEMBLING THE SAME

(71) Applicant: The Boeing Company, Chicago, IL (US)

(72) Inventors: Daniel James Cowan, North Charleston, SC (US); Bart Stevens, Summerville, SC (US)

(73) Assignee: The Boeing Company, Chicago, IL (US)

( * ) Notice: Subject to any disclaimer, the term of this patent is extended or adjusted under 35 U.S.C. 154(b) by 261 days.

(21) Appl. No.: 17/527,056

(22) Filed: Nov. 15, 2021

(65) Prior Publication Data

US 2022/0153430 A1 May 19, 2022

Related U.S. Application Data

(60) Provisional application No. 63/115,743, filed on Nov. 19, 2020.

(51) Int. Cl.
| | |
|---|---|
| *B64D 45/00* | (2006.01) |
| *B64D 45/02* | (2006.01) |
| *F16B 33/00* | (2006.01) |
| *F16B 37/14* | (2006.01) |

(52) U.S. Cl.
CPC ............ *B64D 45/02* (2013.01); *F16B 33/004* (2013.01); *F16B 37/14* (2013.01)

(58) Field of Classification Search
CPC ....... B64D 45/00; B64D 45/02; F16B 33/004; F16B 37/14; F16B 33/00
See application file for complete search history.

(56) References Cited

U.S. PATENT DOCUMENTS

| | | | |
|---|---|---|---|
| 10,501,202 B2 | 12/2019 | Roper et al. | |
| 10,512,805 B2 | 12/2019 | Damazo et al. | |
| 10,655,667 B2 | 5/2020 | Stevens et al. | |
| 10,962,043 B2 * | 3/2021 | Stevens | .................. F16B 35/06 |
| 11,754,111 B2 * | 9/2023 | Cowan | .................. F16B 33/004 |
| | | | 411/369 |
| 2019/0323546 A1 | 10/2019 | Stevens et al. | |
| 2019/0331160 A1 | 10/2019 | Cowan et al. | |

(Continued)

FOREIGN PATENT DOCUMENTS

| | | |
|---|---|---|
| EP | 3260708 A1 | 12/2017 |
| EP | 3650715 A1 | 5/2020 |

*Primary Examiner* — Adolf D Berhane
(74) *Attorney, Agent, or Firm* — Quinn IP Law

(57) ABSTRACT

A seal-cover assembly for a structure including a first side and a second side opposing the first side. The seal-cover assembly includes a cap defining a recess, and an insert fixed to the cap within the recess to form a cover unit. The cover unit is configured to be secured to the first side of the structure. The seal-cover assembly includes a fastener configured to be disposed through the structure from the second side of the structure. The fastener is attached to the cover unit relative to the second side without accessing the first side of the structure. Additionally, an aircraft includes the structure and the seal-cover assembly as discussed above. Furthermore, a method of assembling the seal-cover assembly to the structure includes the cover unit secured to the first side of the structure such that an interior of the cover unit is inaccessible from the first side.

20 Claims, 6 Drawing Sheets

(56) References Cited

U.S. PATENT DOCUMENTS

| | | |
|---|---|---|
| 2020/0032834 A1 | 1/2020 | Auffinger et al. |
| 2020/0080584 A1 | 3/2020 | Roper et al. |
| 2020/0080585 A1 | 3/2020 | Roper et al. |
| 2020/0094088 A1 | 3/2020 | Damazo et al. |
| 2020/0355215 A1 | 11/2020 | Stevens et al. |
| 2021/0047488 A1 | 2/2021 | Cowan et al. |
| 2021/0285481 A1 | 9/2021 | Cowan et al. |

* cited by examiner

SEAL-COVER ASSEMBLY FOR AN AIRCRAFT OR OTHER STRUCTURE AND A METHOD OF ASSEMBLING THE SAME

CROSS-REFERENCE TO RELATED APPLICATIONS

This application claims priority to, and the benefit of, U.S. Provisional Patent Application No. 63/115,743 filed on Nov. 19, 2020, which is hereby incorporated by reference in its entirety.

BACKGROUND

A containment cap is used to completely cover an end portion of a metallic fastener that is disposed through a fuel tank, etc. The containment cap electrically insulates the end portion of the metallic fastener and completely contains the end portion of the metallic fastener. Insulation and containment via the containment cap serves to electrically isolate the metallic fastener from various components, such as components within a vicinity of the fuel tank or sensitive electronic equipment within an aircraft. Electrically isolating and completely containing the end portion of the metallic fastener via the containment cap prevents unwanted sparks, unwanted transmission of hot matter, or electrical current transmissions, from entering the surrounding structure upon an electromagnetic effect (EME) or lightning strike event.

However, installation of the metallic fastener requires access to both sides of the fuel tank to secure the metallic fastener to the fuel tank. Furthermore, the containment cap is installed after the metallic fastener is secured to the fuel tank.

SUMMARY

Therefore, it is desirable to develop a seal-cover assembly in which a fastener is secured to a structure from one side of the structure, and a cap is secured to the structure prior to the fastener being installed.

The present disclosure pertains to a seal-cover assembly for a structure including a first side and a second side opposing the first side. The seal-cover assembly includes a cap defining a recess, and an insert fixed to the cap within the recess to form a cover unit. The cover unit is configured to be secured to the first side of the structure. The seal-cover assembly also includes a fastener configured to be disposed through the structure from the second side of the structure. The fastener is attached to the cover unit relative to the second side without accessing the first side of the structure.

The present disclosure also pertains to an aircraft including a structure and a seal-cover assembly. The structure includes a first side and a second side that opposes the first side. The seal-cover assembly includes a cap defining a recess, and an insert fixed to the cap within the recess to form a cover unit. The cover unit is secured to the first side of the structure. The seal-cover assembly also includes a fastener disposed through the structure from the second side of the structure. The fastener is attached to the cover unit relative to the second side without accessing the first side of the structure.

The present disclosure further pertains to a method of assembling a seal-cover assembly to a structure. A cover unit is secured to a first side of the structure such that an interior of the cover unit is inaccessible from the first side of the structure. A fastener is inserted through the structure relative to a second side of the structure. The fastener is attached to the interior of the cover unit relative to the second side of the structure without accessing the first side of the structure to attach the fastener to the cover unit.

The detailed description and the drawings or FIGS. are supportive and descriptive of the disclosure, but the claim scope of the disclosure is defined solely by the claims. While some of the best modes and other configurations for carrying out the claims have been described in detail, various alternative designs and configurations exist for practicing the disclosure defined in the appended claims.

Figure 1:
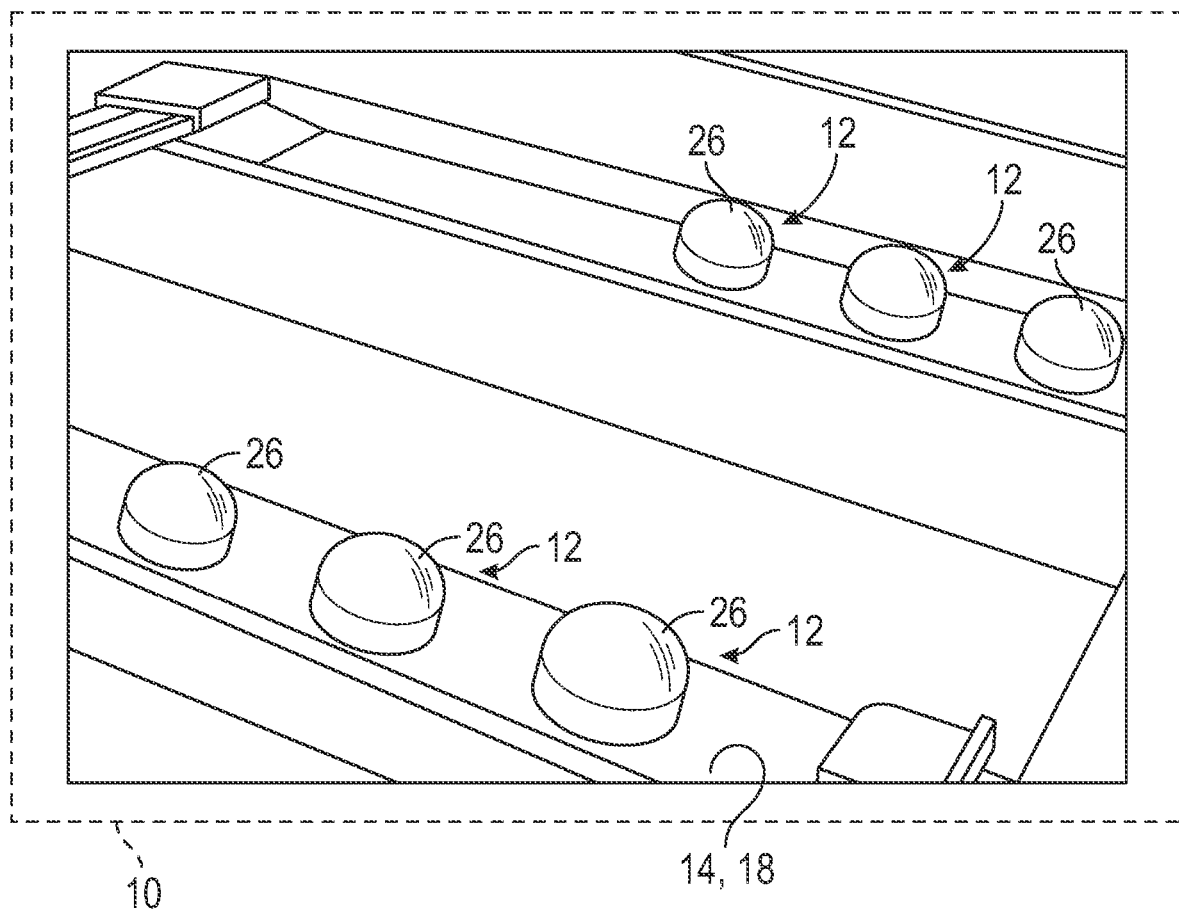
FIG. 1 is a schematic illustration of a seal-cover assembly secured to a structure.

The present disclosure may be extended to modifications and alternative forms, with representative configurations shown by way of example in the drawings and described in detail below. Inventive aspects of the disclosure are not limited to the disclosed configurations. Rather, the present disclosure is intended to cover modifications, equivalents, combinations, and alternatives falling within the scope of the disclosure as defined by the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims.

Referring to the figures, wherein like numerals indicate like or corresponding parts throughout the several views, an aircraft 10 and a seal-cover assembly 12 is generally shown in FIG. 1. As discussed further below, generally, the seal-cover assembly 12 provides a way to isolate various components to prevent undesirable events, and additionally, the seal-cover assembly 12 provides a one-sided installation process.

Optionally, the seal-cover assembly 12 may be used in the aircraft 10. Other non-limiting examples that the seal-cover assembly 12 may be used in include, a movable platform such as a motor vehicle, a watercraft, a railcar, a farm vehicle, etc.; farm equipment; stationary platforms; stationary or mobile power plants; robots; conveyors; transport platforms; etc. Additional non-limiting examples that the seal-cover assembly 12 may be used in include, a tank, such as one or more fuel tanks, a container, a receptacle, or other similar components that may contain a fluid, such as a combustible fluid, a flammable fluid, or other similar fluid, etc. It is to be appreciated that the fluid may be in liquid form or gaseous form.

Generally, the aircraft 10 may include a fuselage and wings that extend from the fuselage. The aircraft 10 may include a structure 14 coupled to the fuselage or the wings. The structure 14 may be coupled to the fuselage or the wings via a support 16 (see FIG. 2; shown in phantom lines (dash-dot-dot-dash lines)). The support 16 may be further defined as a frame, a brace, a sheet, a wall, or any other suitable component that may support the structure 14. Generally, the seal-cover assembly 12 is utilized for the structure 14, and specifically, may attach the structure 14 to the support 16. It is to be appreciated that any suitable number of the seal-cover assemblies 12 may be used to couple the structure 14 to the support 16, and FIG. 1 is illustrative of one non-limiting example. The below discussion mainly discusses one seal-cover assembly 12, but applies to any number of the seal-cover assemblies 12.

The structure 14 may be configured to contain the fluid, and may be any suitable configuration. Therefore, for example, the structure 14 may be further defined as the tank, the container, the receptacle, etc. as discussed above, that may contain the fluid. Generally, the structure 14 may be utilized in a combustible environment or similar environment. As such, the structure 14 may contain the fluid, and as one non-limiting example, the structure 14 may be the fuel tank that contains fuel. The fuel tank may be disposed inside of one of the wings of the aircraft 10 and secured to one of the wings via the support 16. As another non-limiting example, the structure 14 may contain electronic equipment, and the structure 14 may be disposed inside of the fuselage. The structure 14 containing the electronic equipment may be secured to the fuselage via the support 16.

Figure 2:
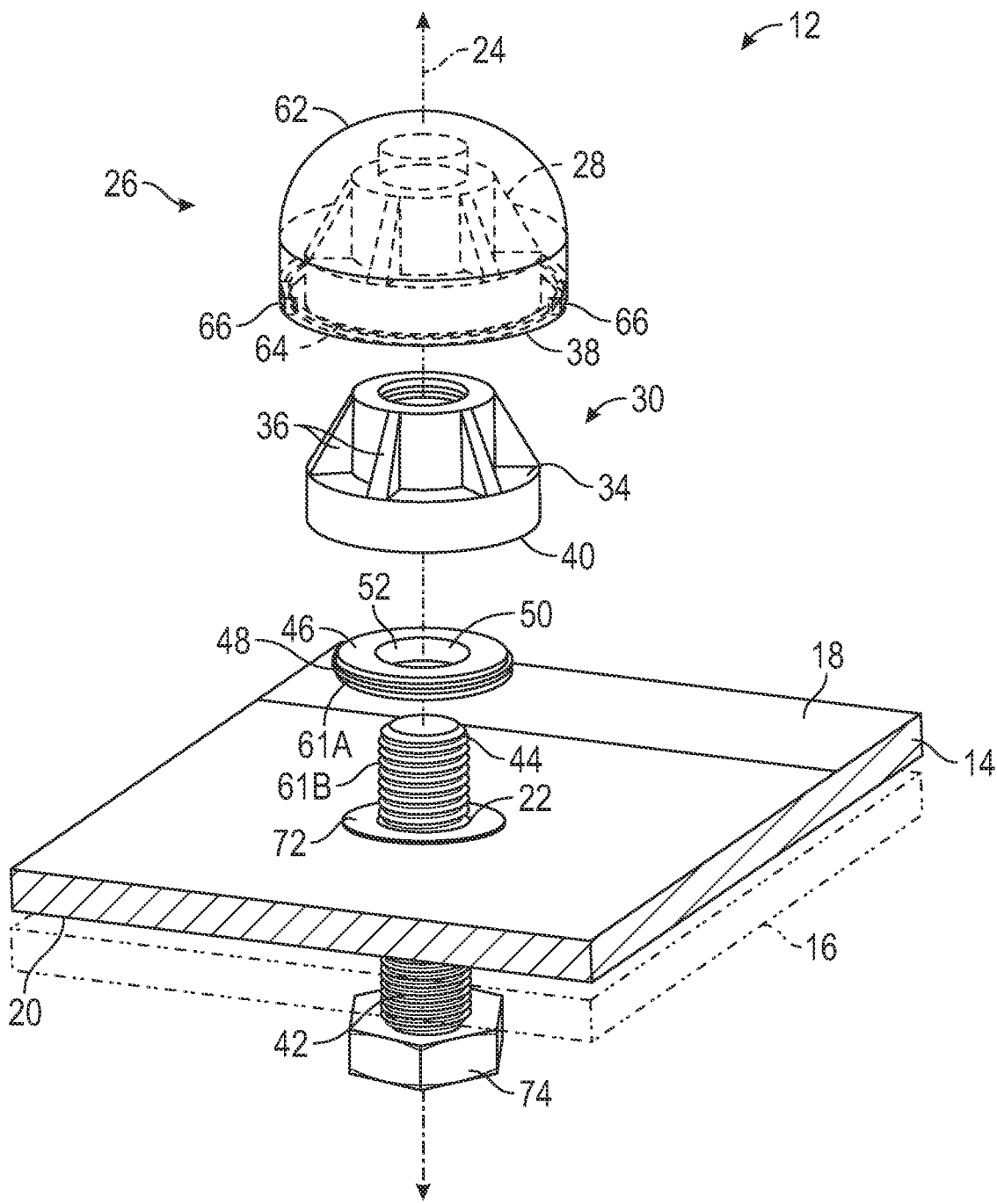
FIG. 2 is a schematic exploded perspective view of the seal-cover assembly relative to the structure.

Referring to FIGS. 1 and 2, generally, the structure 14 may include a first side 18 and a second side 20 opposing the first side 18. The first side 18 of the structure 14 may provide a boundary that contains the fluid therein, and the second side 20 may be exposed outside of the structure 14. Therefore, using the tank example above, the first side 18 may be disposed inside of the tank and contains the fuel therein, and the second side 20 may be exposed outside of the tank and part of the second side 20 faces the support 16.

Referring to FIG. 2, the structure 14 may also define an opening 22 that is utilized to secure the seal-cover assembly 12 to the structure 14. The opening 22 may be defined through the first side 18 and the second side 20 of the structure 14. Generally, the opening 22 may be disposed along a longitudinal axis 24. In certain configurations, the opening 22 may be further defined as a plurality of openings 22 spaced from each other along the structure 14. If the structure 14 defines the plurality of openings 22, then more than one of the seal-cover assemblies 12 may be utilized.

Figure 3:
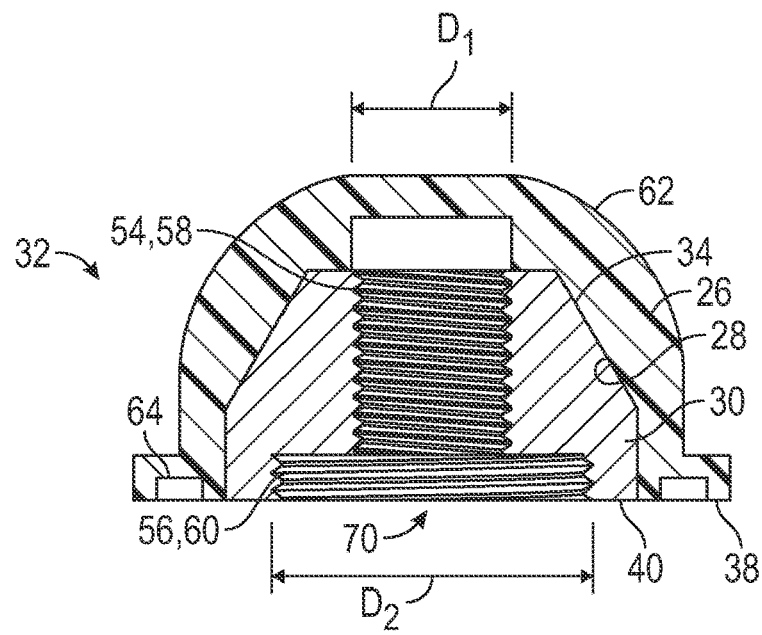
FIG. 3 is a schematic cross-sectional view of a cover unit of the seal-cover assembly.
Figure 4:
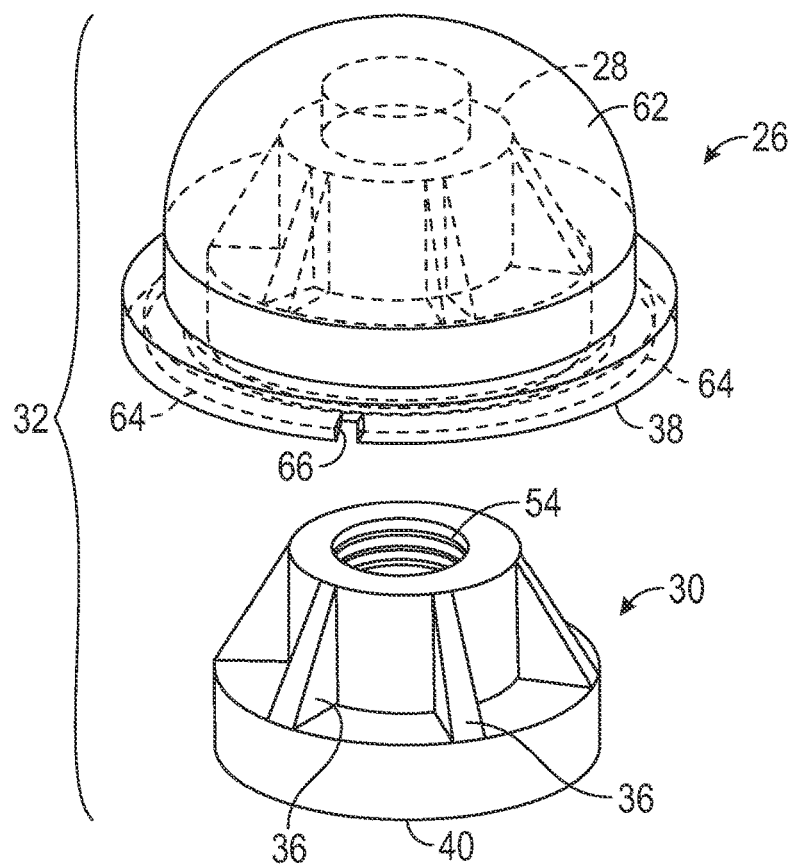
FIG. 4 is a schematic exploded perspective view of the cover unit of FIG. 3.

Turning to FIGS. 2-4, the seal-cover assembly 12 includes a cap 26 that prevents the fluid from accessing inside of the cap 26. Specifically, the cap 26 prevents both gaseous and liquid fluids from entering the cap 26. As such, the cap 26 acts as an isolator to prevent electrical transmission to the fluid, prevent corrosion of components inside of the cap 26, and/or prevent leaking of the fluid into the cap 26, etc. Therefore, for example, if an electromagnetic effect (EME) occurs or a lightning strike event occurs, the cap 26 prevents transmission of current or spark into the vicinity of the fluid, as well as prevents transmission of hot matter from resistive heating due to electrical transmission of current into the vicinity of the fluid. Hence, the cap 26 may be utilized to prevent ignition of the fluid. As another example, if the fluid has properties that may cause corrosion of other parts, the cap 26 may prevent the fluid from entering the cap 26.

As best shown in FIGS. 3 and 4, the cap 26 defines a recess 28, and the cap 26 includes an insert 30 fixed to the cap 26 within the recess 28 to form a cover unit 32. That is, the insert 30 may include an outer surface 34, and the outer surface 34 of the insert 30 interacts with the cap 26 to form the cover unit 32. Generally, the cover unit 32 is configured to be secured to the first side 18 of the structure 14. Therefore, for example, the cover unit 32 is disposed inside of the tank where the fluid is stored. The cover unit 32 is disposed over the opening 22 of the structure 14 to prevent access to, or conceal, the opening 22 relative to the first side 18 of the structure 14. The cover unit 32 is secured to the first side 18 of the structure 14 before other installation processes occur, which will be discussed below.

Generally, the cap 26 and the insert 30 are formed of different materials. For example, the insert 30 may be formed of a metallic material, and the cap 26 may be formed of a nonconductive material. As such, the metallic material of the insert 30 is different from the nonconductive material of the cap 26. The cap 26, formed of the nonconductive material, is permanently attached to the outer surface 34 of the insert 30 to form the cover unit 32. That is, the cap 26 and the insert 30 are inseparable from each other when formed into the cover unit 32.

The metallic material of the insert 30 is generally formed of a conductive material, and thus, electrical transmission may occur through the insert 30. Therefore, the conductive material of the insert 30 is referring to material that is electrically conductive, and the nonconductive material of the cap 26 is referring to material that is not electrically conductive. The cap 26 is formed of the nonconductive material to prevent the electrical transmission to the fluid if the EME event or the lightning strike event occurs. Non-limiting examples of the metallic material of the insert 30 may include steel, iron, alloy, etc. The nonconductive material of the cap 26 may be a polymer, an elastomer, a nylon, plastic, thermoplastic, and/or combinations thereof.

Generally, the cap 26 isolates the insert 30 from the fluid to prevent the metallic material of the insert 30 from directly contacting the fluid. Therefore, the cap 26 is designed to conceal the insert 30 relative to the first side 18 of the structure 14 such that the insert 30 does not come into contact with the fluid stored inside the structure 14 relative to the first side 18. If the EME event or the lightning strike event occurs in the vicinity of the structure 14, the electrical transmission may enter various components of the aircraft 10. The cap 26 will prevent the electrical transmission via the insert 30 into the structure 14 and into contact with the fluid.

The cap 26 and the insert 30 may be permanently attached or fixed together using a molding process or an adhesive process. Therefore, in certain configurations, the recess 28 of the cap 26 may be formed by molding the cap 26 to the insert 30. Hence, the molding process forms the recess 28 of the cap 26 around the configuration of the insert 30. Alternatively, the cap 26 may be pre-formed with the recess 28, and then the cap 26 and the insert 30 are fixed to each other via adhesive, etc.

To assist in fixing the insert 30 and the cap 26 together regardless of the process used, the outer surface 34 of the insert 30 may include a grip feature 36. The grip feature 36 provides a surface for the nonconductive material to affix thereto. That is, the nonconductive material of the cap 26 may formed around the grip feature 36 to permanently attach the cap 26 to the outer surface 34 of the insert 30. Non-limiting examples of the grip feature 36 may include, a plurality of protrusions protruding from the outer surface 34 such as a plurality of ribs as shown in FIGS. 2 and 4; a knurled surface, a grit-blasted surface, an etched surface, a conversion coated surface, a primed surface, etc., and/or combinations thereof.

Figure 5:
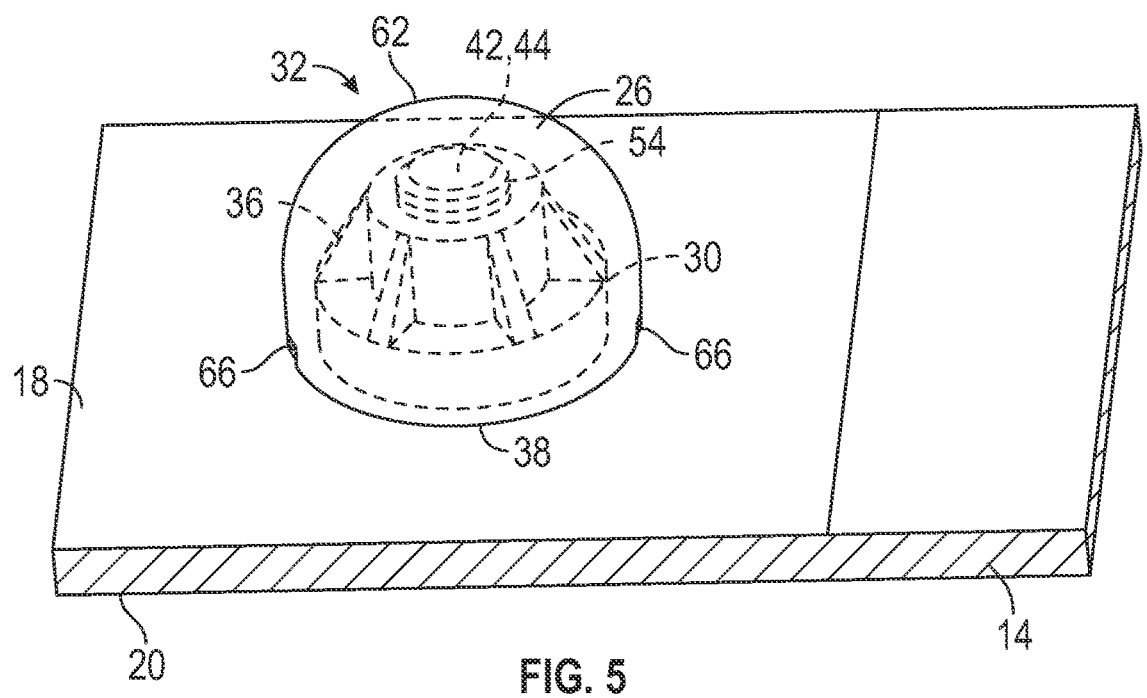
FIG. 5 is a schematic perspective view of the cover unit secured to the structure, with an insert of the cover unit illustrated in hidden lines inside of a cap of the cover unit and an end portion of a fastener secured to the insert also illustrated in hidden lines.
Figure 6:
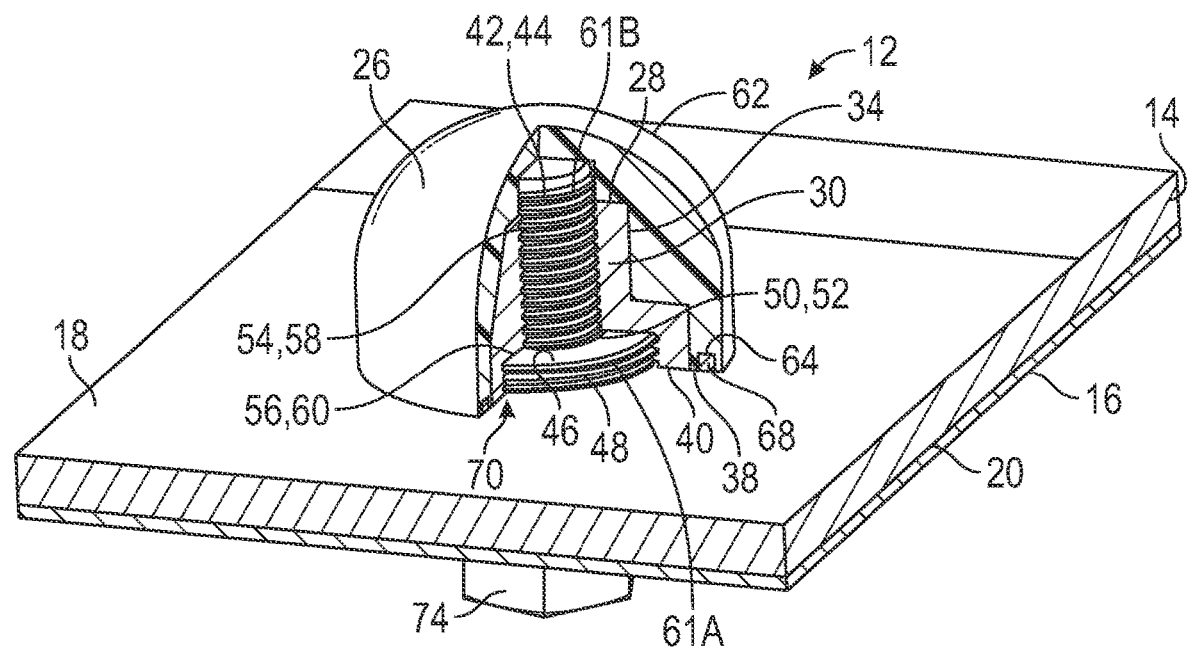
FIG. 6 is a schematic perspective view of the seal-cover assembly secured to the structure, with the cover unit partially cut away to illustrate a washer and the fastener disposed inside of the cover unit.

Referring to FIGS. 3 and 5, the cap 26 encloses the insert 30. A portion of the insert 30 is accessible from inside of the cap 26 to secure the cover unit 32 to the structure 14. Therefore, generally, the cap 26 may include an end face 38 (see FIG. 3) defining the recess 28 that extends into the cap 26, and the portion of the insert 30 is accessible from the end face 38. Therefore, the recess 28 of the cap 26 is open at the end face 38, and the portion of the insert 30 within the recess 28 is exposed relative to the end face 38 of the cap 26. Turning to FIG. 6, the end face 38 of the cap 26 may abut the first side 18 of the structure 14 when the cover unit 32 is secured to the structure 14, which causes the entire insert 30 to be concealed between the cap 26 and the structure 14.

More specifically, the insert 30 may include a face surface 40 (see FIG. 3) that faces outwardly in the same direction as the end face 38 of the cap 26. Therefore, as shown in FIG. 6, the face surface 40 of the insert 30 may abut the first side 18 of the structure 14 when the cover unit 32 is secured to the structure 14. The face surface 40 is disposed adjacent to the outer surface 34 of the insert 30. The portion of the insert 30 may be further defined as the face surface 40.

Turning to FIGS. 2 and 6, the seal-cover assembly 12 also includes a fastener 42 configured to be disposed through the structure 14 from the second side 20 of the structure 14. That is, the fastener 42 is attached to the cover unit 32 relative to the second side 20 without accessing the first side 18 of the structure 14. More specifically, the cover unit 32 is secured to the first side 18 of the structure 14 before installing the fastener 42, and thus, both sides 18, 20 of the structure 14 are not accessed during the installation of the fastener 42. Therefore, due to the way the fastener 42 is installed from one-side of the structure 14, i.e., the second side 20, the seal-cover assembly 12 provides a one-sided installation process, which may reduce installation time and/or simplify installation, and thus, provide a cost savings. Furthermore, the one-sided installation process may also reduce an amount of work performed in confined spaces, such as within the tank, which may improve the working environment.

Figure 10:
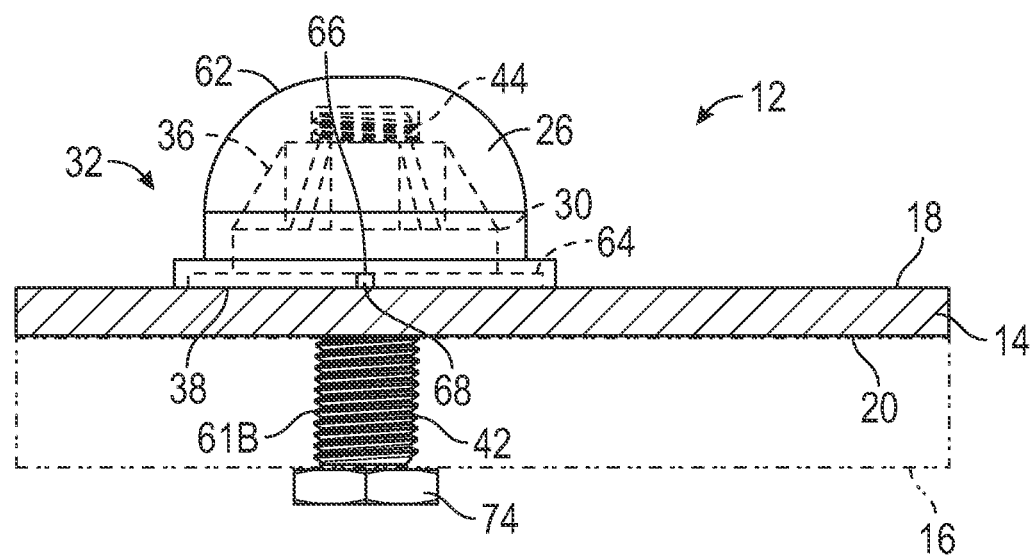
FIG. 10 is a schematic side view of the fastener attached to the structure and the cover unit relative to the second side of the structure, with a support illustrated in phantom lines.

Referring to FIGS. 2, 4 and 10, the fastener 42 is inserted through the opening 22 of the structure 14 to access the cover unit 32, which, as discussed above, is disposed over the opening 22. Therefore, during attachment of the fastener 42 to the insert 30, the fastener 42 is not accessible from the first side 18 of the structure 14 because the cover unit 32 is already in place. Generally, the cap 26 may completely enclose the fastener 42 relative to the first side 18 of the structure 14. As such, the cap 26 contains or isolates the fastener 42 from the fluid to prevent interaction therebetween. For example, by isolating the fastener 42 from the fluid, the fastener 42 may be preserved and/or electrical transmission to the fluid may be prevented, etc. As additional examples, by isolating the fastener 42 from the fluid, corrosion of the fastener 42 may be avoided, fluid tightness over the fastener 42 may be provided, and/or pressure tightness relative to the fastener 42 may be prevented, etc.

As discussed above, the cover unit 32 is secured to the first side 18 of the structure 14, and thus, the fastener 42 cannot access the insert 30 from the first side 18 of the structure 14. As such, the fastener 42 is disposed through the structure 14 from the second side 20 of the structure 14 to access the insert 30. The fastener 42 is attached to the insert 30 of the cover unit 32 such that the cap 26 conceals the fastener 42 relative to the first side 18 of the structure 14. More specifically, as best shown in FIG. 6, the cap 26 may enclose an end portion 44 of the fastener 42 relative to the first side 18 of the structure 14. Specifically, as shown in FIG. 5, the cap 26 encloses the insert 30 and the end portion 44 of the fastener 42 relative to the first side 18 of the structure 14 such that the fastener 42 is inaccessible from the first side 18 of the structure 14.

The fastener 42 may be any suitable configuration, and non-limiting examples may include a screw, a bolt, a stud, etc. Furthermore, the fastener 42 is formed of a metallic material, and therefore, the cap 26 is utilized to prevent the metallic material of the fastener 42 from directly contacting the fluid. Generally, the cap 26 and the fastener 42 are formed of different materials. As discussed above, the cap 26 is formed of the nonconductive material, and the nonconductive material of the cap 26 is different from the metallic material of the fastener 42.

The metallic material of the fastener 42 is generally formed of a conductive material, and thus, electrical transmission may occur through the fastener 42. The conductive material of the fastener 42 is referring to material that is electrically conductive, and the nonconductive material of the cap 26 is referring to material that is not electrically conductive (as discussed above). Therefore, the cover unit 32 is designed to conceal the fastener 42 relative to the first side 18 of the structure 14 such that the fastener 42 does not come into contact with the fluid stored in the structure 14 relative to the first side 18. As discussed above, if the EME event or the lightning strike event occurs in the vicinity of the structure 14, the electrical transmission may enter various components of the aircraft 10. The cover unit 32, and more specifically, the cap 26, will prevent the electrical transmission via the fastener 42 into contact with the fluid. Non-limiting examples of the metallic material of the fastener 42 may include steel or other iron-based alloy, titanium-based alloy, nickel-based alloy, aluminum alloy, etc.

As best shown in FIGS. 2 and 6, the seal-cover assembly 12 may include a washer 46 that secures the cover unit 32 to the structure 14. Generally, the washer 46 is secured to the first side 18 of the structure 14. The washer 46 is utilized to anchor the cover unit 32 to the first side 18 of the structure 14. The washer 46 may include an outer edge 48, and may include an inner edge 50 defining a hole 52 disposed along the longitudinal axis 24. The hole 52 washer 46 and the opening 22 of the structure 14 may align with each other such that the fastener 42 may be inserted through the opening 22 and the hole 52. The outer edge 48 of the washer 46 may oppose the inner edge 50 of the washer 46. Furthermore, the washer 46 lays over part of the first side 18 such that the outer edge 48 is exposed (see FIG. 8) to interact with the insert 30 as discussed further below.

The insert 30 has features to secure the cover unit 32 to the washer 46, as well as secure the fastener 42 to the insert 30. As best shown in FIG. 3, the insert 30 may define a first aperture 54 and a second aperture 56 disposed adjacent to the first aperture 54. In certain configurations, the first aperture 54 is disposed along the longitudinal axis 24 and the second aperture 56 is disposed along the longitudinal axis 24 adjacent to the first aperture 54. Generally, the fastener 42 is disposed in the first aperture 54 and the washer 46 is disposed in the second aperture 56 as shown in FIG. 6.

Again referring to FIG. 6, the washer 46 is disposed inside of the second aperture 56 of the insert 30, and the outer edge 48 of the washer 46 is secured to the insert 30 inside of the second aperture 56. Specifically, the outer edge 48 of the washer 46 is secured to the insert 30 inside of the second aperture 56 such that the cap 26 abuts the first side 18 of the structure 14 to enclose the washer 46 between the cover unit 32 and the first side 18 of the structure 14. In certain configurations, the insert 30 is threaded to the outer edge 48 of the washer 46 such that the washer 46 is disposed inside of the second aperture 56. Therefore, the insert 30 may act as a nut for the fastener 42.

Turning to the fastener 42, the fastener 42 may be secured to the insert 30 inside of the first aperture 54. More specifically, the fastener 42 may be disposed in the hole 52 of the inner edge 50 of the washer 46, and disposed in the first aperture 54 of the insert 30. In certain configurations, the fastener 42 is disposed through both of the first aperture 54 and the second aperture 56. As best shown by the combination of FIGS. 2 and 3, generally, the first aperture 54, the second aperture 56, and the opening 22 align with each other relative to the longitudinal axis 24, which prevents binding of the fastener 42 when the fastener 42 is inserted through the structure 14 and into the cover unit 32. Also, as best shown in FIG. 6, the second aperture 56 is disposed between the opening 22 of the structure 14 and the first aperture 54 of the insert 30.

As best shown in FIG. 3, the first aperture 54 and the second aperture 56 of the insert 30 may be different sizes to accommodate different sized components. In certain configurations, the first aperture 54 of the insert 30 has a first diameter $D_1$ and the second aperture 56 of the insert 30 has a second diameter $D_2$. Furthermore, in certain configurations, the first diameter $D_1$ is less than the second diameter $D_2$. The first diameter $D_1$ is sized to accommodate the fastener 42, and the second diameter $D_2$ is sized to accommodate the washer 46.

Generally, the fastener 42 may be threaded to the insert 30 inside of the first aperture 54, and the washer 46 may be threaded to the insert 30 inside of the second aperture 56 (see FIG. 6). Therefore, as best shown in FIG. 3, the insert 30 may include a first threaded portion 58 that faces into the first aperture 54 and a second threaded portion 60 that faces into the second aperture 56. In certain configurations, the outer edge 48 of the washer 46 and the second threaded portion 60 of the insert 30 are threaded together. Furthermore, the end portion 44 of the fastener 42 and the first threaded portion 58 of the insert 30 are threaded together without accessing the outer surface 34 of the insert 30 and without causing the cover unit 32 to unthread from the washer 46.

To prevent the cover unit 32 from unthreading or loosening from the washer 46 as the fastener 42 is being attached to the insert 30, threads 61A of the washer 46 and threads 61B of the fastener 42 may be in different directions. As such, the first threaded portion 58 may present threads in a first direction, and the fastener 42 may have threads 61B in the same direction as the first threaded portion 58, and additionally, the second threaded portion 60 may present threads in a second direction, and the washer 46 may have threads 61A in the same direction as the second threaded portion 60. The first direction and the second direction are different from each other. For example, the first threaded portion 58 of the insert 30 and the threads 61B of the fastener 42 may accommodate right-handed threads, and then, the second threaded portion 60 of the insert 30 and the threads 61A of the washer 46 may accommodate left-handed threads. Therefore, as the fastener 42 is being rotated about the longitudinal axis 24 into the insert 30, the direction of rotation of the fastener 42 will cause the cover unit 32 to tighten (the cover unit 32 is previously tightened to the washer 46 so little to no rotation will actually occur as the fastener 42 is tightened) on the washer 46 instead of loosen from the washer 46 due to the threads 61A of the washer 46 being in a different direction from the threads 61B of the fastener 42. Having the threads 61A of the washer 46 and the threads 61B of the fastener 42 in different directions also assists in allowing the one-sided installation of the fastener 42.

Turning back to the cover unit 32, an additional sealing process may be utilized to further assist in preventing leaking of the fluid into the cap 26. Referring to FIGS. 3, 4, and 6, the cap 26 may include an exterior surface 62 that extends from the end face 38 to surround the recess 28 and the insert 30. The end face 38 of the cap 26 may define a groove 64 spaced from the recess 28, and generally, the groove 64 surrounds the insert 30. More specifically, in certain configurations, the groove 64 is spaced from and surrounds the insert 30. The groove 64 of the end face 38 is open to the first side 18 of the structure 14 as best shown in FIG. 6. As best shown in FIGS. 4 and 5, the exterior surface 62 of the cap 26 may define an entrance 66 to the groove 64.

A sealant 68 may be injected into the groove 64 to further seal the cap 26 relative to the first side 18 of the structure 14. More specifically, the sealant 68 may be injected into the groove 64 via the entrance 66. Generally, more than one entrance 66 may be defined in the exterior surface 62 of the cap 26, and may assist in providing an indication of when the sealant 68 has completely filled the groove 64, and may also act as a vent to expel gaseous fluid out of the groove 64 as the sealant 68 is being injected therein. For example, if the sealant 68 is being injected into one entrance 66, the sealant 68 may be continually injected until some of the sealant 68 seeps out of the other entrance 66. The sealant 68 engages the first side 18 of the structure 14 and the cap 26 to provide additional sealing therebetween. This sealing via the sealant 68 also prevents the fluid, including the gaseous fluid, from entering the cap 26, and thus the cap 26 may be air tight; and therefore, the cap 26 may resist pressure gradients from inside and outside of the structure 14. Once the sealant 68 cures, the sealant 68 assists in further isolation of the insert 30 and the fastener 42 from the fluid inside of the structure 14. Any suitable sealant 68 may be used to prevent the fluid from entering the cover unit 32.

The present disclosure also provides a method of assembling the seal-cover assembly 12 to the structure 14. Generally, the cover unit 32 is secured to the first side 18 of the structure 14 such that an interior 70 of the cover unit 32 is inaccessible from the first side 18 of the structure 14. That is, the interior 70 of the cover unit 32 isolates the insert 30 and the fastener 42 from the fluid inside of the structure 14.

Figure 7:
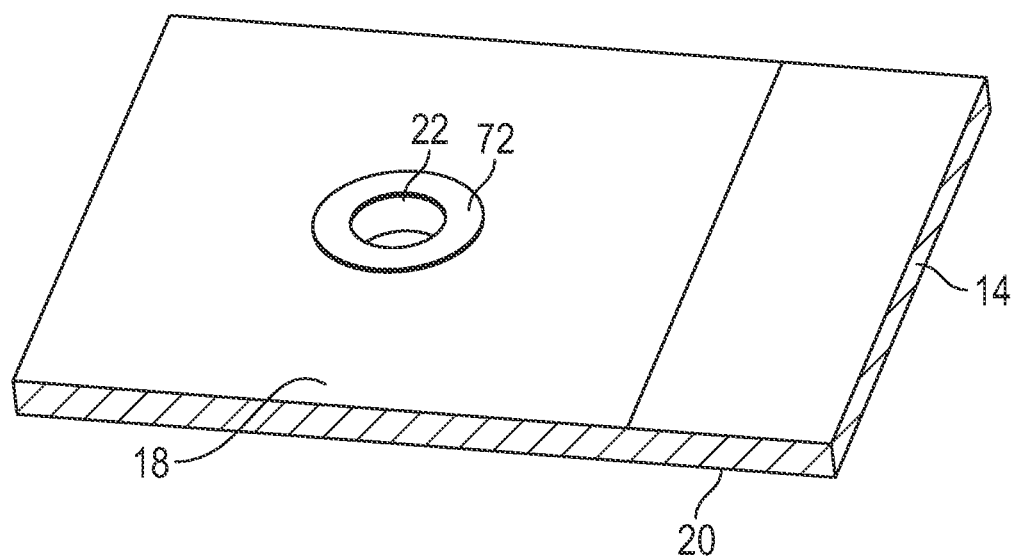
FIG. 7 is a schematic perspective view of the structure having an adhesive applied around an opening of the structure.

Referring to FIG. 7, an adhesive 72 may be applied to the first side 18 of the structure 14 to secure the washer 46 to the structure 14. In addition to applying the adhesive 72 to the first side 18, or instead of applying the adhesive 72 to the first side 18, the adhesive 72 may be applied to the washer 46, and then the washer 46 is placed on the first side 18 of the structure 14. Regardless of how the adhesive 72 is applied, the adhesive 72 may bond, bind, join, etc., the washer 46 to the structure 14. For example, the adhesive 72 may be applied around the opening 22 of the structure 14. Generally, the adhesive 72 is applied to the first side 18 of the structure 14 before the cover unit 32 is secured to the first side 18 of the structure 14. Any suitable adhesive 72 may be used to secure the washer 46 to the structure 14.

Figure 8:
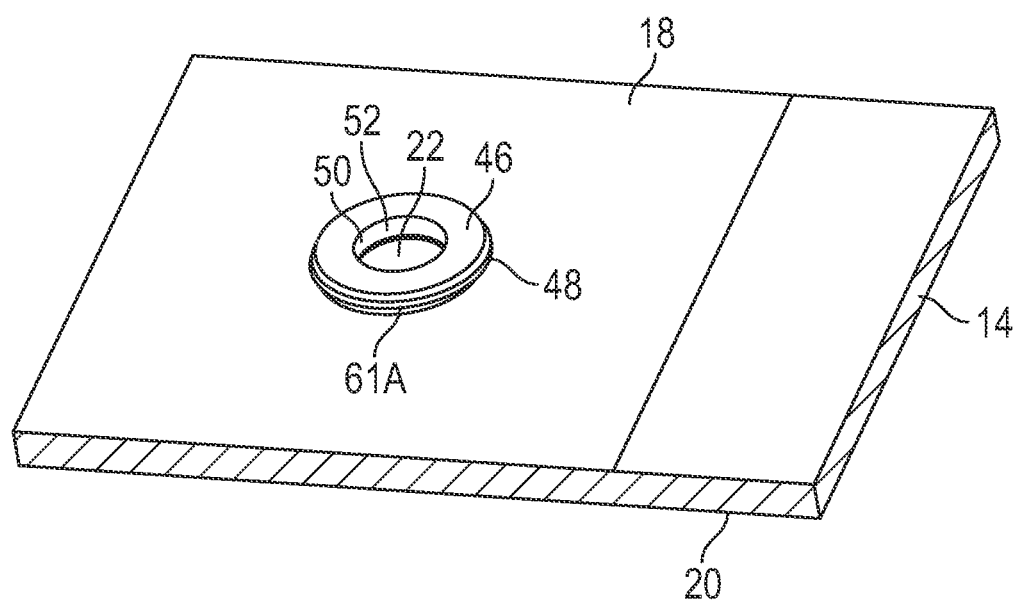
FIG. 8 is a schematic perspective view of the structure with the washer disposed on the adhesive of FIG. 7.

Referring to FIG. 8, the washer 46 is secured to the first side 18 of the structure 14. As mentioned above, the washer 46 is secured to the structure 14 via the adhesive 72. The washer 46 is used to anchor the cover unit 32 to the first side 18 of the structure 14. The washer 46 is placed on the adhesive 72 before the adhesive 72 cures.

Figure 9:
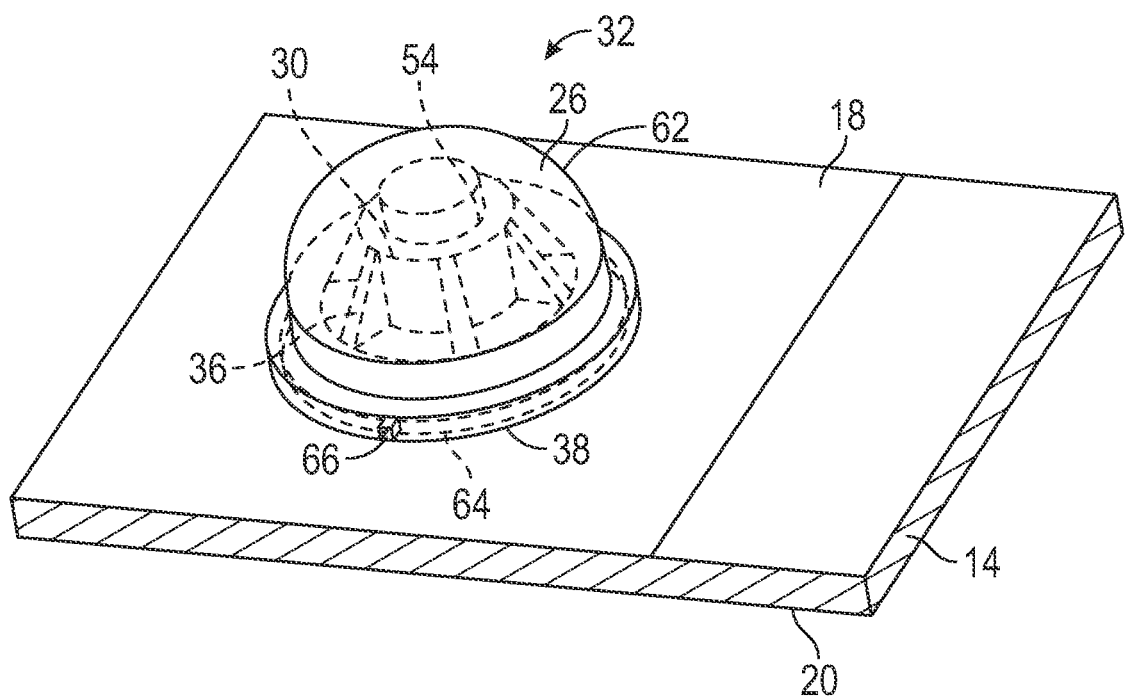
FIG. 9 is a schematic perspective view of the cover unit secured to the first side of the structure, with the insert illustrated in hidden lines inside of the cap and a groove of the cap also illustrated in hidden lines.

After securing the washer 46 to the structure 14, then the cover unit 32 may be secured to the washer 46. As discussed above, the cover unit 32 includes the cap 26 surrounding the insert 30, and the insert 30 is disposed within the interior 70 of the cover unit 32. As shown in FIG. 9, the cover unit 32 is secured to the first side 18 of the structure 14 before the fastener 42 is attached to the interior 70 of the cover unit 32. The cover unit 32 may be rotated about the longitudinal axis 24 until the end face 38 of the cap 26 abuts the first side 18 of the structure 14. Specifically, the insert 30 is threaded to the washer 46 until the cover unit 32 is tightened to the structure 14. Therefore, in certain configurations, securing the cover unit 32 to the first side 18 of the structure 14 may further include threading the insert 30 of the cover unit 32 to the washer 46.

Once the cover unit 32 is secured to the first side 18 of the structure 14 via the washer 46, the additional sealing process may be performed. Specifically, the sealant 68 may be injected into the groove 64 of the cover unit 32 after securing the cover unit 32 to the first side 18 of the structure 14. The sealant 68 may be injected into the entrance 66 and any excess sealant 68 that exits out of the groove 64 from the injection process may be removed or wiped off of the exterior surface 62 of the cap 26 and/or the first side 18 of the structure 14. Generally, the sealant 68 is injected into the groove 64 before the fastener 42 is attached to the cover unit 32, and additionally, any excess sealant 68 is removed before the fastener 42 is attached to the cover unit 32.

Once the sealant 68 cures, the fastener 42 may be disposed through the structure 14 and attached to the cover unit 32 as shown in FIG. 10. The structure 14 may be positioned relative to the support 16, and then the fastener 42 is disposed through the structure 14 and the support 16 to fix these components together. The fastener 42 is inserted through the structure 14 relative to the second side 20 of the structure 14. More specifically, the fastener 42 is inserted through the support 16, the opening 22 of the structure 14, and into the insert 30.

As best shown in FIG. 10, the cover unit 32 is disposed along an opposite side of the structure 14 than where the fastener 42 is inserted through the structure 14. The fastener 42 is attached to the interior 70 (see FIG. 6) of the cover unit 32 relative to the second side 20 of the structure 14 without accessing the first side 18 of the structure 14 to attach the fastener 42 to the cover unit 32. That is, the fastener 42 is attached to the insert 30, which is inside of the interior 70 of the cover unit 32. The fastener 42 does not access the first side 18 of the structure 14 in order to secure the fastener 42 to the cover unit 32. The fastener 42 is rotated about the longitudinal axis 24 until a head 74 of the fastener 42 abuts the support 16 and pinches the structure 14 between the cover unit 32 and the support 16. In other words, the fastener 42 is tightened until the structure 14 is secured to the support 16.

The seal-cover assembly 12 as described herein may be a retrofittable part, which may provide a cost savings. Also, the seal-cover assembly 12 as described herein may provide assembly labor savings and improve production rates because of the one-sided installation of the fastener 42. Therefore, with this design, both sides 18, 20 of the structure 14 are not accessed during the installation of the fastener 42.

As mentioned above, more than one of the seal-cover assemblies 12 may be utilized depending on the number of the openings 22 defined via the structure 14. Therefore, more than one cover unit 32, more than one washer 46, and more than one fastener 42 may be utilized depending on the number of the openings 22 of the structure 14.

Aspects of the present disclosure have been described in detail with reference to the illustrated configuration. Those skilled in the art will recognize, however, that certain modifications may be made to the disclosed structure and/or methods without departing from the scope of the present disclosure. The disclosure is also not limited to the precise construction and compositions disclosed herein. Modifications apparent from the foregoing descriptions are within the scope of the disclosure as defined by the appended claims. Moreover, the present concepts expressly include combinations and sub-combinations of the preceding elements and features.

What is claimed is:

1. A seal-cover assembly for a structure including a first side and a second side opposing the first side, the seal-cover assembly comprising:
   a cap defining a recess;
   an insert fixed to the cap within the recess to form a cover unit;
   wherein the cover unit is configured to be secured to the first side of the structure; and
   a fastener configured to be disposed through the structure from the second side of the structure, and the fastener is attached to the cover unit relative to the second side without accessing the first side of the structure.

2. The seal-cover assembly as set forth in claim 1 wherein the fastener is attached to the insert of the cover unit such that the cap conceals the fastener relative to the first side of the structure.

3. The seal-cover assembly as set forth in claim 2 wherein:
   the insert includes an outer surface; and
   the cap is formed of a nonconductive material that is permanently attached to the outer surface of the insert to form the cover unit.

4. The seal-cover assembly as set forth in claim 3 wherein:
   the outer surface of the insert includes a grip feature; and
   the nonconductive material of the cap is formed around the grip feature to permanently attach the cap to the outer surface of the insert.

5. The seal-cover assembly as set forth in claim 3 wherein the insert is formed of a metallic material that is different from the nonconductive material.

6. The seal-cover assembly as set forth in claim 2 wherein:
   the cap includes an end face defining the recess that extends into the cap;
   the cap includes an exterior surface that extends from the end face to surround the recess and the insert; and the end face defines a groove spaced from the recess, and the groove surrounds the insert.

7. The seal-cover assembly as set forth in claim 1:
further including a washer having an outer edge;
wherein the insert defines a first aperture disposed along a longitudinal axis and a second aperture disposed along the longitudinal axis adjacent to the first aperture;
wherein the fastener is disposed through both of the first aperture and the second aperture; and
wherein the washer is disposed inside of the second aperture of the insert, and the outer edge of the washer is secured to the insert inside of the second aperture.

8. The seal-cover assembly as set forth in claim 7 wherein:
the first aperture of the insert has a first diameter and the second aperture of the insert has a second diameter;
the first diameter is less than the second diameter; and
the fastener is threaded to the insert inside of the first aperture, and the washer is threaded to the insert inside of the second aperture.

9. The seal-cover assembly as set forth in claim 8 wherein:
the insert includes a first threaded portion that faces into the first aperture and a second threaded portion that faces into the second aperture;
the first threaded portion presents threads in a first direction;
the second threaded portion presents threads in a second direction; and
the first direction and the second direction are different from each other.

10. The seal-cover assembly as set forth in claim 1 wherein:
the cap includes an end face defining a groove; and
the groove is spaced from and surrounds the insert.

11. The seal-cover assembly as set forth in claim 1:
wherein the insert defines a first aperture disposed along a longitudinal axis and a second aperture disposed along the longitudinal axis adjacent to the first aperture;
further including a washer having an inner edge defining a hole disposed along the longitudinal axis, and the fastener is disposed in the hole of the inner edge and disposed in the first aperture of the insert; and
wherein the washer has an outer edge opposing the inner edge, and the insert is threaded to the outer edge of the washer such that the washer is disposed inside of the second aperture.

12. The seal-cover assembly as set forth in claim 1 wherein:
the fastener is formed of a metallic material;
the cap is formed of a nonconductive material that is different from the metallic material of the fastener;
the insert includes an outer surface having a grip feature; and
the nonconductive material of the cap is formed around the grip feature to permanently attach the cap to the outer surface of the insert and the cap encloses an end portion of the fastener relative to the first side of the structure.

13. The seal-cover assembly as set forth in claim 1 wherein:
the insert includes an outer surface; and
the cap is formed of a nonconductive material that is permanently attached to the outer surface of the insert to form the cover unit.

14. An aircraft comprising:
a structure including a first side and a second side that opposes the first side;
a seal-cover assembly comprising:
a cap defining a recess;
an insert fixed to the cap within the recess to form a cover unit;
wherein the cover unit is secured to the first side of the structure; and
a fastener disposed through the structure from the second side of the structure, and the fastener is attached to the cover unit relative to the second side without accessing the first side of the structure.

15. The aircraft as set forth in claim 14 wherein:
the seal-cover assembly includes a washer secured to the first side of the structure, and the washer includes an outer edge;
the insert defines a first aperture and a second aperture disposed adjacent to the first aperture;
the outer edge of the washer is secured to the insert inside of the second aperture such that the cap abuts the first side of the structure to enclose the washer between the cover unit and the first side of the structure;
the fastener is secured to the insert inside of the first aperture; and
the cap encloses the insert and an end portion of the fastener relative to the first side of the structure such that the fastener is inaccessible from the first side of the structure.

16. The aircraft as set forth in claim 15 wherein:
the insert includes an outer surface;
the cap is formed of a nonconductive material that is permanently attached to the outer surface of the insert to form the cover unit;
the cap includes an end face that abuts the first side of the structure;
the insert includes a first threaded portion that faces into the first aperture and a second threaded portion that faces into the second aperture;
the first threaded portion presents threads in a first direction;
the second threaded portion presents threads in a second direction;
the first direction and the second direction are different from each other;
the outer edge of the washer and the second threaded portion of the insert are threaded together; and
the end portion of the fastener and the first threaded portion of the insert are threaded together without accessing the outer surface of the insert and without causing the cover unit to unthread from the washer.

17. A method of assembling a seal-cover assembly to a structure, the method comprising:
securing a cover unit to a first side of the structure such that an interior of the cover unit is inaccessible from the first side of the structure;
inserting a fastener through the structure relative to a second side of the structure; and
attaching the fastener to the interior of the cover unit relative to the second side of the structure without accessing the first side of the structure to attach the fastener to the cover unit.

18. The method as set forth in claim 17:
further comprising securing a washer to the first side of the structure; and
wherein securing the cover unit to the first side of the structure further comprises threading an insert of the cover unit to the washer, and wherein the insert is disposed within the interior of the cover unit.

19. The method as set forth in claim 17 wherein securing the cover unit to the first side occurs before attaching the fastener to the interior of the cover unit.

20. The method as set forth in claim 17:
- further comprising injecting a sealant into a groove of the cover unit after securing the cover unit to the first side of the structure; and
- wherein injecting the sealant into the groove occurs before attaching the fastener to the cover unit.

* * * * *